US010673089B2

(12) United States Patent
Hughes et al.

(10) Patent No.: US 10,673,089 B2
(45) Date of Patent: Jun. 2, 2020

(54) REDUCTION-OXIDATION FLOW BATTERY

(71) Applicant: SIEMENS AKTIENGESELLSCHAFT, Munich (DE)

(72) Inventors: Timothy Hughes, Wantage (GB); Ulrich Stimming, Newcastle Upon Tyne (GB); Jochen Friedl, Newcastle Upon Tyne (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/095,482

(22) PCT Filed: Apr. 21, 2017

(86) PCT No.: PCT/EP2017/059494
§ 371 (c)(1),
(2) Date: Oct. 22, 2018

(87) PCT Pub. No.: WO2017/182617
PCT Pub. Date: Oct. 26, 2017

(65) Prior Publication Data
US 2019/0097252 A1    Mar. 28, 2019

(30) Foreign Application Priority Data

Apr. 21, 2016  (GB) .................... 1606953.6

(51) Int. Cl.
*H01M 8/18*    (2006.01)
*H01M 8/0221*  (2016.01)
*H01M 8/08*    (2016.01)

(52) U.S. Cl.
CPC ........ *H01M 8/188* (2013.01); *H01M 8/0221* (2013.01); *H01M 8/08* (2013.01); *H01M 2300/0008* (2013.01); *H01M 2300/0011* (2013.01)

(58) Field of Classification Search
CPC ...... H01M 8/0221; H01M 8/08; H01M 8/188; H01M 8/20; H01M 2300/0008; H01M 2300/0011; Y02E 60/528
See application file for complete search history.

(56) References Cited

U.S. PATENT DOCUMENTS 4,396,687 A * 8/1983 Kummer ................. H01M 8/20
                                                429/417
2010/0297522 A1  11/2010 Creeth et al.
2011/0014527 A1   1/2011 Ohlsen
(Continued)

FOREIGN PATENT DOCUMENTS

GB          2515511 A    12/2014

OTHER PUBLICATIONS

Tsigdinos et al: "Synthesis and Electrochemical Properties of Heteropolymolybdates", Journal of the Less-Common Metals, vol. 36, No. 1-2, pp. 79-93 (1974).
(Continued)

*Primary Examiner* — Wyatt P McConnell
(74) *Attorney, Agent, or Firm* — Schiff Hardin LLP

(57)  ABSTRACT

A reduction-oxidation flow battery wherein the catholyte and/or the anolyte are selected from among respective defined groups of polyoxometalate compounds.

4 Claims, 1 Drawing Sheet

(56) References Cited

U.S. PATENT DOCUMENTS

| | | | |
|---|---|---|---|
| 2011/0189520 A1* | 8/2011 | Carter | B60L 50/64 |
| | | | 429/107 |
| 2015/0030961 A1 | 1/2015 | Davies et al. | |
| 2015/0180071 A1 | 6/2015 | Knuckey et al. | |
| 2015/0349342 A1* | 12/2015 | Creeth | H01M 8/188 |
| | | | 429/105 |
| 2016/0043425 A1 | 2/2016 | Anderson et al. | |
| 2016/0133949 A1* | 5/2016 | Madabusi | H01M 8/18 |
| | | | 429/508 |

OTHER PUBLICATIONS

Pratt et al: "A Polyoxometalate Flow Battery", Journal of Power Sources, vol. 236, pp. 259-264 (2013).

* cited by examiner

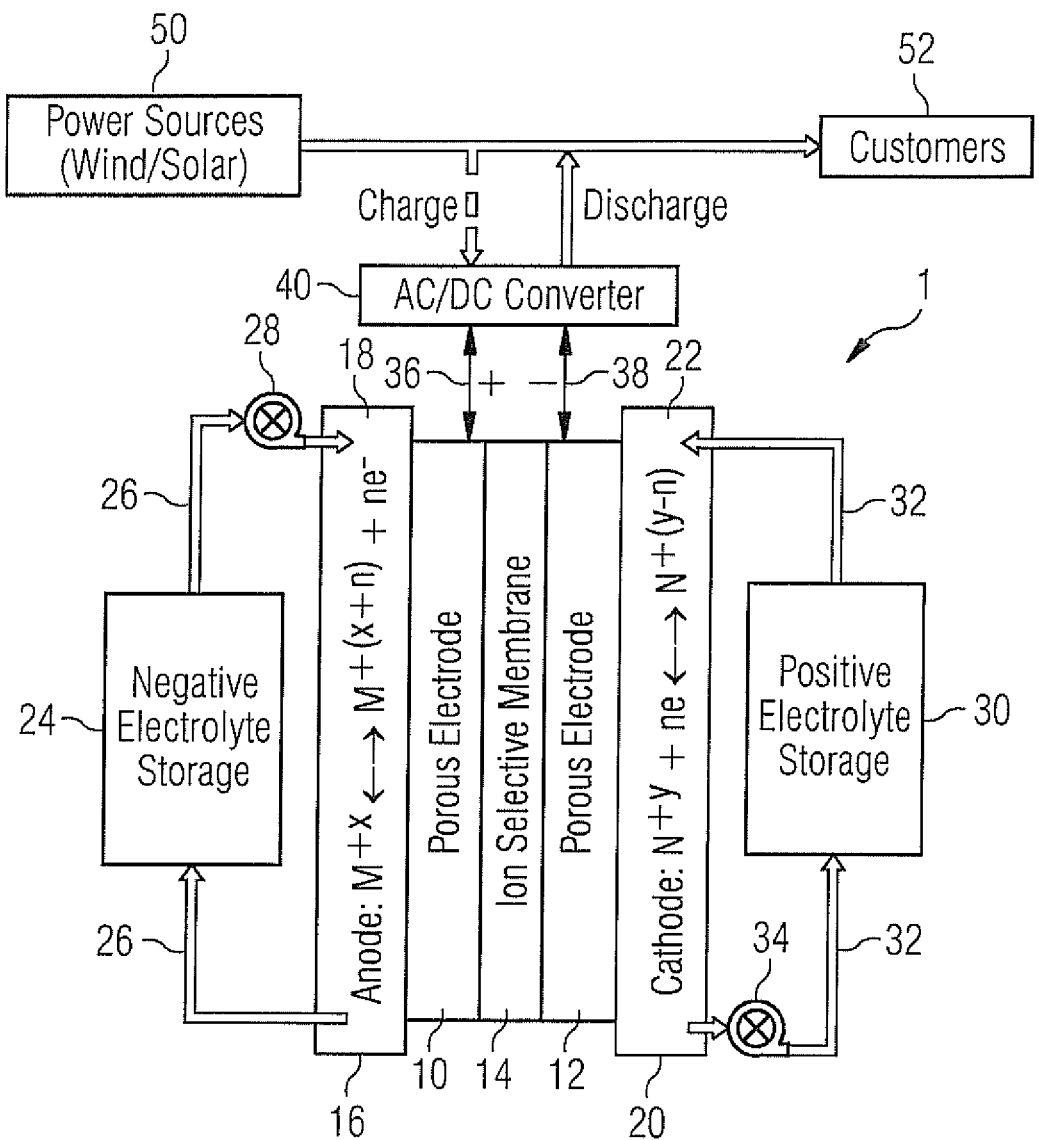

REDUCTION-OXIDATION FLOW BATTERY

BACKGROUND OF THE INVENTION

Field of the Invention

The present invention relates to reduction-oxidation flow batteries. More particularly, it relates to a selection of electrolytes for efficient energy storage and transfer.

Flow batteries are described by T. Nguyen and R. F. Savinell in *the Electrochemical Society "Interface"* Fall 2010, pp. 54-56, and in Q. Xu and T. S. Zhao *"Fundamental models for flow batteries"*, Progress in Energy and Combustion Science 49 92015) 40-58.

The following US patent applications also describe examples of flow batteries:

US 2009/0317668 A1
US 2014/0004391 A1.

FIG. 1, taken from the Nguyen and Savinell article, schematically illustrates a flow battery 1. A porous anode 10 and a porous cathode 12 are separated by an ion selective membrane 14. A first electrolyte vessel 16 provides a first electrolyte solution 18 to the porous anode 10 on a surface directed away from the ion selective membrane 14. A second electrolyte vessel 20 provides a second electrolyte solution 22 to the porous cathode 12 on a surface directed away from the ion selective membrane 14. A first electrolyte storage tank 24 is linked to first electrolyte vessel 16 by pipes 26 and pump 28. A second electrolyte storage tank 30 is linked to second electrolyte vessel 20 by pipes 32 and pump 34.

First electrolyte storage tank 24 stores a "negative electrolyte" or "anolyte" 18. The anolyte takes part in electron uptake and release at a reduction-oxidation equilibrium which may be expressed as:

$$M^{x-} \leftrightarrow M^{(x-n)-} + ne^-.$$

Second electrolyte storage tank 30 stores a "positive electrolyte" or "catholyte" 22. The catholyte takes part in electron release and uptake at a reduction-oxidation equilibrium which may be expressed as:

$$N^{y-} + ne^- \leftrightarrow N^{(y+n)-}.$$

Because of the existence of these reduction-oxidation reactions, the anolyte and catholyte may be considered, and referred to, as "reduction-oxidation species".

The flow battery 1 may be charged and discharged through anode connector 36 and cathode connector 38.

In a typical application, a renewable energy source 50, such as a wind, solar or tidal generator, provides renewable power to customers 52 at an AC voltage. However, it is required to be able to store some power generated by the generator 50 at times that demand by the customers 52 does not require the full amount of power generated by the generator 50, and to release the stored power at times that demand by the customers 52 exceeds the amount of power being generated by the generator 50. The flow battery may be used to store and release such power. It must first be converted from AC to DC by converter 40. When an excess of power is generated by the generator 50, positive and negative voltages from the generator are respectively applied to porous anode 10 and porous cathode 12. Electrons are drawn from the anolyte 18 and stored in the catholyte 22. Electrolyte molecules in the anolyte become more positively charged, while electrolyte molecules on the catholyte become more negatively charged. The electrolytes are circulated by pumps 28, 34 from the electrolyte vessels 16, 20 to the electrolyte storage tanks 24, 30. Storage of power within the flow battery may continue until all of the reduction-oxidation species of at least one of the anolyte and the catholyte are fully charged.

On the other hand, the drawing of power from the flow battery to provide to the customers 52 involves a reverse, discharging, process. In that case, electrons are transferred from the catholyte to the anolyte. This DC current is converted by the converter 40 into an AC current for supply to the customers 52.

SUMMARY OF THE INVENTION

The present invention does not propose any changes to the arrangement shown in FIG. 1, but rather proposes particularly advantageous electrolyte species.

BRIEF DESCRIPTION OF THE DRAWINGS

The FIGURE illustrates an example of the structure of a conventional flow battery, which can also be used in accordance with the invention, with the inventive electrolyte species.

Various combinations of electrolytes (anolyte/catholyte) are known, and each has its own characteristics. Some examples are provided in the paper by Nguyen and Savinell, mentioned above.

In an example of Vanadium-based electrolytes, the anode reduction-oxidation equilibrium reaction may be:

$$V^{2+} \leftrightarrow V^{3+} + e^-$$

and the cathode equilibrium reduction-oxidation reaction may be:

$$VO_2^+ + 2H^+ + e^- \leftrightarrow VO^{2+} + H_2O$$

In each case, it can be seen that each reduction-oxidation of the anolyte and catholyte ion species stores and releases a single electron.

The present invention provides combinations of electrolytes in which each reduction-oxidation ion species of the anolyte and catholyte may store and release several electrons.

Typically, the anolyte and the catholyte will be in aqueous solution, with a further supporting electrolyte. In the example Vanadium-based system outlined above, the supporting electrolyte may be sulphuric acid H2SO4, which dissociates in aqueous solution to H+ and $SO_4^{2-}$ ions.

According to an aspect of the present invention, the catholyte and the anolyte are selected from among the respective following groups of polyoxometalate compounds:

Catholytes:
(i) $C_6V_{10}O_{28}$ with cation C which is either H+, Li+, Na+, or a mixture thereof, or
(ii) $C_9PV_{14}O_{42}$ with cation C which is either H+, Li+, Na+, or a mixture thereof, With a supporting electrolyte of one or a mixture of:
(i) Na2SO4
(ii) Li2SO4
(iii) LiCH3COO or
(iv) NaCH3COO
(v) HCl
(vi) H3PO4
(vii) H2SO4

The supporting electrolyte increases the solubility of the reduction-oxidation species, increases the conductivity of the catholyte and provides a balancing ionic flow through the membrane.

During charging, the Vanadium reduction-oxidation centres are oxidized from V(IV) to V(V) releasing one electron each.

Anolytes:
(i) $C_4SiW_{12}O_{40}$ with cation C which is either: $H^+$, $Li^+$, $Na^+$; or a mixture thereof.
(ii) $C_4SiMo_{12}O_{40}$ with cation C which is either: $H^+$, $Li^+$, $Na^+$; or a mixture thereof.
(iii) $C_3PW_{12}O_{40}$ with cation C which is either: $H^+$, $Li^+$, $Na^+$; or a mixture thereof.
(iv) $C_5AlW_{12}O_{40}$ with cation C which is either: $H^+$, $Li^+$, $Na^+$; or a mixture thereof.

with a supporting electrolyte of one or a mixture of:
(i) $Na_2SO_4$
(ii) $Li_2SO_4$
(iii) $LiCH_3COO$ or
(iv) $NaCH_3COO$
(v) HCl
(vi) $H_3PO_4$
(vii) $H_2SO_4$ The supporting electrolyte increases the solubility of the reduction-oxidation species, increases the conductivity of the anolyte and provides a balancing ionic flow through the membrane.

During charging the Tungsten or Molybdenum reduction-oxidation centres are reduced from W(VI) to W(V) or Mo(VI) to Mo(V) releasing one electron each.

The membrane 14 is required to be permeable to at least one ion of the cations of the supporting electrolyte, i.e. $H^+$, $Na^+$ or $Li^+$ but to be impermeable to the reduction-oxidation species contained in the anolyte or catholyte. Suitable materials would be perfluorosulfonic acid membranes like Nafion N117 from DuPont.

The combination of porous anode 10, ion selective membrane 14 and porous cathode 12 may be referred to as a "stack" or "flow plate".

Use of electrolytes according to the present invention provides at least some of the following advantages.

As each reduction-oxidation species ion of the electrolytes of the present invention is capable of transferring multiple electrons, more efficient charging and discharging and a greater stored-charge density is possible than with conventional vanadium ion based flow batteries.

The lower charge-transfer resistance of the polyoxometalate (POM) electrolytes as compared to vanadium electrolytes increases voltage efficiency and increases the power density.

The lower charge-transfer resistance of the POM electrolytes as compared to vanadium electrolytes reduces capital costs as a smaller power converter is sufficient. A smaller power converter reduces costs for membranes and cell components arid reduces the geometric footprint of the battery.

Polyoxometalate (POM) electrolytes comprise large reduction-oxidation species ions, which exhibit slower permeation through the membrane than vanadium ions, which reduces self-discharge of the flow battery.

Polyoxometalate (POM) electrolytes can achieve a higher energy density than vanadium ions for a given volume of electrolyte, which may reduce the geometric footprint and therefore capital costs of the flow battery.

Polyoxometalate (POM) electrolytes as described for the catholyte are easily prepared, which minimises capital costs.

Polyoxometalate (POM) electrolytes described for anolyte and catholyte are stable in pH 2-3 which is less corrosive than commonly employed acidic solvents. This also may reduce capital costs as less stringent requirements are placed on associated storage vessels.

The polyoxometalate (POM) electrolytes of the present invention allow the transfer of more than one electron with each reduction-oxidation species ion. The lower charge-transfer resistance of the POM reduction-oxidation species ions compared to vanadium ions enables faster charging and discharging, increased current output and higher current output per unit surface area of the membrane. A smaller membrane surface area may therefore be used, and/or a smaller volume of electrolyte, reducing system cost and system size, and/or improved charging/discharging rate and capacity may be achieved.

As the polyoxometalate (POM) electrolytes comprise relatively large reduction-oxidation species, they may be restrained by relatively thin membrane. Such membranes are likely to be relatively cheap. It is important, however, that the anolyte and catholyte species should be kept separate, without any degree of mixing.

Examples of suitable membrane materials include cation exchange membranes based on perfluorosulfonic acid polymer membranes such as Nafion N117 by DuPont.

Polyoxometalate (POM) electrolytes have been found to dissolve more readily in aqueous solvents than vanadium ion electrolytes, enabling a higher concentration of electrolyte to be produced and used.

With the Polyoxometalate (POM) electrolytes of the invention, a given power output may be achieved with a smaller active area of membrane.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. A reduction-oxidation flow battery comprising:
a first electrolyte storage tank containing an anolyte, which comprises one of the following species:
(i) $C_4SiW_{12}O_{40}$ with cation C which is either: $H^+$, $Li^+$, $Na^+$; or a mixture thereof;
(ii) $C_4SiMo_{12}O_{40}$ with cation C which is either: $H^+$, $Li^+$, $Na^+$; or a mixture thereof;
(iii) $C_3PW_{12}O_{40}$ with cation C which is either: $H^+$, $Li^+$, $Na^+$; or a mixture thereof; or
(iv) $C_5AlW_{12}O_{40}$ with cation C which is either: $H^+$, $Li^+$, $Na^+$; or a mixture thereof; and
a second electrolyte storage tank containing a catholyte, which comprises one of the following species:
(i) $C_6V_{10}O_{28}$ with cation C which is either $H^+$, $Li^+$, $Na^+$; or a mixture thereof; or
(ii) $C_9PV_{14}O_{42}$ with cation C which is either $H^+$, $Li^+$, $Na^+$; or a mixture thereof.

2. A reduction-oxidation flow battery according to claim 1 wherein the anolyte is in aqueous solution with a supporting electrolyte of one or a mixture of:
(i) $Na_2SO_4$
(ii) $Li_2SO_4$
(iii) $LiCH_3COO$ or
(iv) $NaCH_3COO$
(v) HCl
(vi) $H_3PO_4$
(vii) $H_2SO_4$.

3. A reduction-oxidation flow battery according to claim 1 wherein the catholyte is provided in aqueous solution with a supporting electrolyte of one or a mixture of:
(i) $Na_2SO_4$
(ii) $Li_2SO_4$ (iii) LiCH$_3$COO or
(iv) NaCH$_3$COO
(v) HCl
(vi) H$_3$PO$_4$
(vii) H$_2$SO$_4$.

4. A reduction-oxidation flow battery according to claim 1 wherein the ion selective membrane comprises a cation exchange membrane based on a perfluorosulfonic acid polymer membrane.

\* \* \* \* \*